US006451431B1

(12) United States Patent
Brady et al.

(10) Patent No.: US 6,451,431 B1
(45) Date of Patent: Sep. 17, 2002

(54) FILM SUPPORT WITH ANNEALABLE LAYER AND IMPROVED ADHESION

(75) Inventors: Brian K. Brady, North Chili; Charles L. Bauer, Webster, both of NY (US); Dennis J. Eichorst, Lenexa, KS (US); Bradley K. Coltrain, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/854,732

(22) Filed: May 14, 2001

Related U.S. Application Data

(63) Continuation-in-part of application No. 09/751,724, filed on Dec. 29, 2000.

(51) Int. Cl.[7] ........................... B32B 9/00; B32B 23/08; B32B 27/08; B32B 27/34; B32B 27/36

(52) U.S. Cl. ............................... 428/423.7; 428/475.2; 428/478.2; 428/480; 428/481; 430/523; 430/527; 430/531; 430/533; 430/539

(58) Field of Search .......................... 428/423.7, 475.2, 428/478.2, 480, 481; 430/523, 527, 531, 533, 539

(56) References Cited

U.S. PATENT DOCUMENTS

| | | | | |
|---|---|---|---|---|
| 2,627,088 A | | 2/1953 | Alles et al. | |
| 2,779,684 A | | 1/1957 | Alles | |
| 3,143,421 A | | 8/1964 | Nadeau et al. | |
| 4,225,665 A | | 9/1980 | Schadt, III | |
| 4,542,093 A | | 9/1985 | Suzuki et al. | |
| 5,198,499 A | | 3/1993 | Anderson et al. | |
| 5,427,900 A | | 6/1995 | James et al. | |
| 5,432,050 A | | 7/1995 | James et al. | |
| 5,580,707 A | | 12/1996 | Kawamoto | |
| 5,719,016 A | | 2/1998 | Christian et al. | |
| 5,766,835 A | * | 6/1998 | Matsunaga | 430/523 |
| 6,306,568 B1 | * | 10/2001 | Brady et al. | 430/527 |

FOREIGN PATENT DOCUMENTS

| | | |
|---|---|---|
| JP | 7219122 A | 8/1995 |

* cited by examiner

*Primary Examiner*—Vivian Chen
(74) *Attorney, Agent, or Firm*—Doreen M. Wells

(57) ABSTRACT

A photographic support comprising; a polyester base having a first and a second side; an antistatic layer superposed on the first side of the base; a gelatin layer superposed on the second side of the base; and an auxiliary layer overlying said antistatic layer comprising 20 to 80 percent by weight hydroxypropyl methyl cellulose and a second binder.

5 Claims, No Drawings

FILM SUPPORT WITH ANNEALABLE LAYER AND IMPROVED ADHESION

CROSS REFERENCE TO RELATED APPLICATIONS

This application is a continuation-in-part of application Ser. No. 09/751,724, filed Dec. 29, 2000, which is hereby incorporated by reference.

This application relates to commonly assigned application Ser. No. 09/751,116, FILM SUPPORT WITH IMPROVED ADHESION UPON ANNEALING, filed Dec. 29, 2000 U.S. Pat. No. 6,306,568, and Continuation-in-Part application Ser. No. 09/854,073, filed herewith.

This application relates to commonly assigned copending application Ser. No. 09/751,114, ANNEALABLE IMAGING SUPPORT, filed Dec. 29, 2000 and Continuation-in-Part application Ser. No. 09/854,794 filed herewith.

This application relates to commonly assigned copending application Ser. No. 09/751,725, ANNEALABLE IMAGING SUPPORT CONTAINING A GELATIN SUBBING LAYER AND AN ANTISTATIC LAYER, filed Dec. 29, 2000 and Continuation-in-Part application Ser. No. 09/854,793 filed herewith.

This application relates to commonly assigned copending application Ser. No. 09/751,550, AMINE MODIFIED GELATIN LAYER FOR IMPROVED ADHESION OF PHOTOGRAPHIC ELEMENTS AFTER ANNEALING, filed Dec. 29, 2000 and Continuation-in-Part application Ser. No. 09/854,781 filed herewith.

FIELD OF THE INVENTION

Gelatin based subbing layers for improving the adhesion of photographic emulsion to a polyester support upon thermal annealing films support having an auxiliary layer over an antistat layer that avoids blocking and adhesion problems.

BACKGROUND OF THE INVENTION

Because of curl and core-set specifications, an advanced photo system (APS) film uses a polyethylene naphthalate (PEN) based support that must be annealed before applying the emulsion layers. It is known to prepare the film support using a commonly available oriented PEN base, annealing the base, and then applying the adhesive (subbing) and backing layers to form the following structure:

| |
|---|
| Gel based sub |
| adhesion layer |
| PEN support |
| adhesive layer |
| antistat/binder |
| magnetics layer |
| lubricant |

To reduce manufacturing costs it is desirable to manufacture the PEN support and apply as many of the support coatings in line with the base manufacturing before annealing in a wound roll format.

Because the magnetics and lubricant layers are typically coated from organic solvents they generally need to be coated with a separate manufacturing step from the other layers. Because the manegetics layer can degrade is anneal with all the layers it desirable to anneal the package before the application of the magenitics and lubricant layers. If the antistat layer is annealed against the gel sub (when in the rolled format), the antistat will stick to or block with the gel, making it difficult to unwind the roll without tearing or removal of layers.

To prevent blocking, it is possible to apply a water coatable layer on top of the antistat to avoid blocking with the gel sub. Although many materials will not block, an additional problem is getting the magnetics layer (which typically contains a cellulose ester based binder) to adequately adhere to the new layer.

U.S. Pat. No. 4,225,665 describes an antistat layer that contains a carboxylic acid functionalized polymer which is crosslinked with aziridine.

U.S. Pat. No. 5,198,499 describes an antistat layer that is crosslinked with a melamine which provides good abrasion resistance, adhesion and antistatic properties.

U.S. Pat. No. 5,427,900 describes a photographic film with a magnetics layer on the backside. The preferred binder for the magnetics layer is cellulose diacetate that may be crosslinked with isocyanates, aziridines or melamines.

U.S. Pat. No. 5,432,050 describes a magnetics layer with filler particles that may be crosslinked with isocyanates, aziridines or melamines.

JP 7219122A describes a blend of a hydrophillic colloid with a methyl cellulose that provides good blocking resistance when wound on a spool.

U.S. Pat. No. 4,542,093 (JP 60026944) describes a gel/methyl cellulose blend on top of a subbing layer that does not block to the subbing layer on the other side of the support and provides good adhesion with emulsion layers.

SUMMARY OF THE INVENTION

The present application solves the problems discussed above by using a coated layer that contains between 20 and 80 wt% hydroxypropyl methylcellulose on top of the antistat layer in combination with a magnetics layer that contains a crosslinking agent on top of this coating. Such an element solves both the blocking and adhesion problems discussed above. Hence, the present invention discloses:

A photographic support comprising:

- a polyester base having a first and a second side;
- an antistatic layer superposed on the first side of the base;
- a gelatin layer superposed on the second side of the base; and
- an auxiliary layer overlying said antistatic layer comprising 20 to 80 percent by weight hydroxypropyl methyl cellulose and a second binder.

The advantages of the invention are many. The auxiliary layer is an aqueous coatable layer which can be applied in manufacturing prior to annealing which allows a reduction in UMC and improved product flow. The present invention would require no change by industries using the current antistatic technologies and although adding an additional layer to the package does not require an extra pass since aqueous coating stations are usually available. Annealing a support with an antistatic layer has been cited by manufacturers a advantageous for the physical qualities of supports.

The combination of a magnetic layer with a crosslinking agent overlying an auxiliary, protective layer containing between 20 and 80 percent by weight hydroxyl propyl methylcellulose provides a backing package that can be annealed without blocking and provides good adhesion. This combination allows the use of current antistatic layers that, when overcoated with an auxiliary, protective coating, can be annealed against a gelatin subbing layer with blocking. Furthermore, after annealing the support having an antistatic layer and a gelatin subbing layer, excellent adhesion of a magnetic layer can be achieved.

DETAILED DESCRIPTION OF THE INVENTION

Any methyl cellulose material may be used to improve the non-blocking characteristics with hydroxypropyl derivatives preferred. The other component in the non-blocking layer can be any material that is compatible with the methylcellulose and forms a film on drying. Preferred materials are polymers and preferably polymers that provide good adhesion with the magnetics layer. Most preferred are polyurethanes which are aliphatic in nature, have an anionic particle charge and are characterized by an ultimate elongation prior to breaking of at least about 350 percent. Several suitable aliphatic, anionic polyurethanes for use in accordance with the invention are commercially available, from Witco Chemical Co., Greenwich, Conn., including Witcobond W-290H (ultimate elongation 600%), W-293 (725%), W-506 (550%), W-236 (450%) and W-234 (350%).

The crosslinking agent may be any compound as described in U.S. Pat. No. 5,427,900 including isocyanates, aziridines, or melamine resins with melamine-formaldehyde resins preferred.

The imaging support of this invention is suitable for use in various imaging elements including, for example, photographic, electrostatographic, photothermographic, migration, electrothermographic, dielectric recording, and thermal dye transfer imaging elements. Details with respect to the composition and function of this wide variety of imaging elements are provided in U.S. Pat. No. 5,719,016. Imaging elements that can be provided with a support in accordance with this invention can differ widely in structure and composition. For example, they can vary in regard to the type of support, the number and composition of the image forming layers, and the number and kinds of auxiliary layers included in the elements. The image forming layer(s) of a typical photographic imaging element includes a radiation sensitive agent (e.g., silver halide) dispersed in a hydrophilic water-permeable colloid. Suitable hydrophilic colloids include both naturally-occurring substances such as proteins, for example, gelatin, gelatin derivatives, cellulose derivatives, polysaccharides such as dextran, gum arabic, and the like; as well as synthetic polymers, for example, water-soluble polyvinyl compounds such as poly (vinylpyrrolidone), acrylamide polymers, and the like. A common example of an image-forming photographic layer is a gelatin-silver halide emulsion layer. In particular, the photographic elements can be still films, motion picture films, x-ray films, graphic arts films or microfiche. They can be black-and-white elements, color elements adapted for use in negative-positive process or color elements adapted for use in a reversal process.

Polymer film supports which are useful for the present invention include polyester supports such as-1,4-cyclohexanedimethylene tereplithalate, polyethylene 1,2-diphenoxyethane-4,4'-dicarboxylate, polybutylene tereplithalate, and polyethylene naphthalate and the like; and blends or laminates thereof Particularly preferred are polyethylene naphthalate and blends of polyethylene naphthalate with polyethylene tereplithalate. Additional suitable polyester supports, polyester copolymers and polyester blends are disclosed in detail in U.S. Pat. No. 5,580,707.

Film supports can be surface-treated on either or both sides prior to application of the gelatin subbing layer by various processes including corona discharge, glow discharge, LTV exposure, flame treatment, electron-beam treatment or treatment with adhesion-promoting agents including dichloroacetic acid and trichloroacetic acid, phenol derivatives such as resorcinol and p-chloro-m-cresol, solvent washing prior to overcoating with a subbing layer of the present invention. In addition to surface treatment or treatment with adhesion promoting agents, additional adhesion promoting primer or tie layers containing polymers such as vinylidene chloride-containing copolymers, butadiene-based copolymers, glycidyl acrylate or methacrylate-containing copolymers, maleic anhydride-containing copolymers, condensation polymers such as polyesters, polyamides, polyurethanes, polycarbonates, mixtures and blends thereof, and the like may be applied to the polyester support. Particularly preferred primer or tie layers comprise a chlorine containing latex or solvent coatable chlorine containing polymeric layer. Vinyl chloride and vinylidene chloride containing polymers are preferred as primer or subbing layers of the present invention.

The subbing or primer composition may be applied to the polyester base using an in-line process during the base manufacture or by an off-line process. When applied in an in-line process, the layer may be coated on the polyester base prior to orientation, after orientation, or after uniaxial orientation but before biaxial orientation. The primer composition described is typically applied in accordance with U.S. Pat. Nos. 2,627,088 and 3,143,421. The coating formulation is coated onto the amorphous support material, dried, and then the resulting film is oriented by stretching and other steps applied to the film such as heat setting, as described in detail in U.S. Pat. No. 2,779,684. Accordingly, the particular support film used, the procedure and apparatus for the coating thereof and the orientation of the film are not limitations of the present invention. Any of the usual coating apparatus and processing steps employed in the art may be employed in treating the film product of the present invention.

For the imaging side of the support, a hydrophilic subbing layer such as gelatin is applied to the polyester film base prior to heat-treatment. The subbing layer may be applied to a polyester support which has been surface treated or be superposed on any suitable primer layer. A preferred subbing layer for the imaging side of the support is described in U.S. Ser. No 09/067,306 incorporated by reference herein. The gelatin subbing layer is typically used in an amount of from 0.25 to 5 weight percent, preferably 0.5 to 1 weight percent The subbing layer may include addenda such as dispersants, surface active agents, plasticizers, coalescing aids, solvents, co-binders, soluble dyes, solid particle dyes, haze reducing agents, adhesion promoting agents, hardeners, antistatic agents, matting agents, etc. For altering the coating and drying characteristics it is a common practice in the art to use surface active agents (coating aids) or to include a water miscible solvent in an aqueous dispersion. Suitable solvents include ketones such as acetone or methyl ethyl ketone, and alcohols such as ethanol, methanol, isopropanol, n-propanol, and butanol. Underlying subbing, primer or tie layers may also be surface treated, for example by corona. discharge treatment, to aid wetting by the gelatin subbing formulation.

Coated supports in accordance with the present invention are subjected to an extended heat treatment or annealing step after conventional support film manufacturing heat treatment to reduce core-set curling tendencies of the support. Such "post manufacture" heat tempering or annealing includes heating the coated film support at a temperature that is 50 to 5° C. less than the glass transition temperature of the support for at least 6 hours. The heat tempering or annealing step for reducing core-set curling tendencies is distinguishable from typical support manufacturing heat treatment in that it is performed after the support is wound on a roll rather than as part of the primary support manufacturing process. In a preferred embodiment of the present invention, the imaging support consists of a polyethylene-2,6-naphthalate film base which is coated with vinylidene chloride primer layers. A gelatin subbing layer is applied on one side of the support. With respect to polyethylene-2,6-naphthalate, the Tg is about 140 deg. C., and the heat treatment temperature is from 90 deg. C. to 120 deg. C., preferably from 100 deg. C. to 115 deg. C., and more preferably from 105 deg. C. to 115 deg. C.

Photographic elements in accordance with the preferred embodiment of the invention can be single color elements or multicolor elements. Multicolor elements contain image dye-forming units sensitive to each of the three primary regions of the spectrum. Each unit can comprise a single emulsion layer or multiple emulsion layers sensitive to a given region of the spectrum. The layers of the element, including the layers of the image-forming; units, can be arranged in various orders as known in the art. In an alternative format, the emulsions sensitive to each of the three primary regions of the spectrum can be disposed as a single segmented layer.

A typical multicolor photographic element comprises a support bearing a cyan dye image-forming unit comprised of at least one red-sensitive silver halide emulsion layer having associated therewith at least one cyan dyeforming coupler, magenta dye image-forming unit comprising at least one green-sensitive silver halide emulsion layer having associated therewith at least one magenta dye-forming coupler, and a yellow dye image-forming unit comprising at least one blue-sensitive silver halide emulsion layer having associated therewith at least one yellow dye-forming coupler. The element can contain additional layers, such as filter layers, interlayers, antihalation layers, overcoat layers, subbing layers, and the like.

The method of the present invention is illustrated by the following detailed examples of its practice. However, the scope of this invention is by no means limited to these illustrative examples.

EXAMPLE 1

For the following examples, a thick sheet of polyethylene naphthalate (PEN) was melt extruded, a poly(acrylonitrile-co-vinylidene chloride-co-acrylic acid) adhesion promoting layer was applied to both sides of the support. The support was then stretched and tentered forming a 95 micron thick PEN film with approximately 60 nm thick layer of NVcC. To one side of the support was applied approximately 0.09 g/m$^2$ of a gelatin subbing layer. On the side opposite the gelatin subbing layer an antistat layer, 0.015 g/m$^2$ dry coverage, comprising poly(acrylonitrile-co-vinylidene chloride-co-acrylic acid) vanadium pentoxide: Tx-100 at a 1:1:1 wt ratio, was applied from a water solution. The non-blocking layer was coated on top of the antistat layer from water to give a final dry coverage of 0.22 g/m$^2$ and comprised a mixture of hydroxypropyl methyl cellulose (E3 Premium, Dow Chemical) and a polyurethane, Witcobond W236 (Witco Corp). The weight ratios are given in Table 1.

TABLE 1

| Support Sample | E3/W236 weight ratio |
|---|---|
| A | 100/0 |
| B | 75/25 |
| C | 50/50 |
| D | 37.5/62.5 |
| E | 25/75 |
| F | 10/90 |
| G | 0/100 |

The coatings were wound onto a 6 inch core and placed in an oven for 3 days at 110° C. and then 2 days at 100° C. After this, the samples were evaluated for blocking (% sample blocked) against the gel sub, i.e. sticking to the other side of the support when in a wound roll. 0% blocked is required for manufacturing. Support samples A through E did not block while samples F and G did block and were not evaluated further.

TABLE 2

| Sample | non-blocking support (from Table 1) | Dry Adhesion (% removed) | Wet Adhesion (% removed) | |
|---|---|---|---|---|
| H | A | 10 | not tested | invention |
| I | B | 0 | 0 | invention |
| J | C | 0 | 0 | invention |
| K | D | 0 | 0 | invention |
| L | E | 0.5 | 0 | invention |
| M | A | 100 | not tested | comparison |
| N | B | 100 | 97 | comparison |
| O | C | 100 | 78 | comparison |
| P | D | 100 | 12 | comparison |
| Q | E | 100 | 42 | comparison |

The coatings that did not block (samples A-E) were then overcoated with a magnetics layer as described in Table 3, forming samples H through L. This layer was coated from a solvent mixture of dichloromethane/acetone/methylacetoacetate at a wet coverage of 44.1 cc/m$^2$ and then dried. On top of this was coated a 0.022 g/m$^2$ dry coverage of Carnauba wax from an 80/20 toluene/methanol mixture.

A set of comparative magnetic coatings was prepared as above but with no p-toluene sulfonic acid or Cymel-303 added to the magnetics solution. This gave samples M-Q.

TABLE 3

| Component | Percent of solution |
|---|---|
| cellulose diacetate | 2.85 |
| Toda CSF 4085V2 magnetic particles | 0.13 |
| cellulose triacetate | 0.128 |
| dibutylphthalate | 0.153 |
| Gafac PE510 | 0.006 |
| FC431 surfactant from 3M | 0.015 |
| Solsperse | 0.006 |
| AKP-50 abrasive particles | 0.117 |
| p-toluene sulfonic acid | 0.010 |
| Cymel 303 (a melamine formaldehyde resin from Cytec.), 10% based on total solids | 0.340 |

To evaluate adhesion both wet and dry tests were performed and results are given in Table 2.

Dry: 810 Scotch Tape Test=the coating is scoredwith arazorblade in a grid pattern (5 one inch lines, 0.2 inches apart and another 5 at a 45 degree angle to the first set). A piece a 610 Scotch tape is applied over the scored area and the tape is pulled off by hand. This is repeated ten times with a fresh piece of tape. The amount of removal is then assessed given in units of % removed.

Wet: AO abrasion=a 35 mm strip of the coating is soaked at 100F for 3 min 15 sec. in a developer bath. The strip is then scored with a razor blade and placed in a small trough, and a weighted rubber pad is placed on top. The pad is moved back and forth across the strip 100 times. The amount of removal is then assessed given in units of % removed.

The results from table 2 show that by having greater than 10% hydroxypropylmethylcellulose in the non-blocking layer in combination with having a crosslinker in the magnetics layer, good non-blocking and adhesion performance is achieved.

Example 2

In this set of examples the amount and type of crosslinker in the magnetics layer was varied. The support was generated in the same manner as for support sample E in the examples above, i.e. 25/75 E3/W236 as the non-blocking layer. The magnetics layer was prepared and tested as in Example 1 but with the amount and type of crosslinker varying as described in Table 4. The amount of crosslinker added is given as a percent based on the total solids in the coating solution.

TABLE 4

| Sample | Crosslinker | % Cross-linker | Dry Adhesion (% removed) | Wet Adhesion (% removed) | |
|---|---|---|---|---|---|
| R | none | 0 | 100 | 100 | comparison |
| S | Cymel 303 | 5 | 0 | 95 | comparison |
| T | Cymel 303 | 7.5 | 0 | 2 | invention |
| U | Cymel 303 | 10 | 0 | <1 | invention |
| V | Cymel 303 | 12.5 | 0 | <1 | invention |
| W | Desmodur N3300 | 7.5 | 0 | 0 | invention |
| X | Cymel 1170 | 5 | 0 | 0 | invention |

TABLE 4-continued

| Sample | Crosslinker | % Cross-linker | Dry Adhesion (% removed) | Wet Adhesion (% removed) |
|---|---|---|---|---|

Cymel 303 = a melamine formaldehyde resin from Cytec.
Cymel 1170 = a melamine formaldehyde resin from Cytec
Desmodur N3300 = a poly-isocyanate from Bayer The invention has been described in detail with particular reference to certain preferred embodiments thereof, but it will be understood that variations and modifications can be effected within the spirit and scope of the invention.

What is claimed is:

1. A photographic support comprising:

a polyester base having a first and a second side;

an antistatic layer superposed on the first side of the base;

a gelatin layer superposed on the second side of the base; and an auxiliary layer overlying said antistatic layer comprising 20 to 80 percent by weight hydroxypropyl methyl cellulose and a second binder.

2. The photographic support of claim 1 wherein the second binder is polyurethane.

3. The photographic support of claim 1 wherein the photographic support has been annealed.

4. A photographic element comprising:

a polyester base having a first and a second side;

an antistatic layer superposed on the first side of the base;

a gelatin layer superposed on the second side of the base; and an auxiliary layer overlying said antistatic layer comprising 20 to 80 percent by weight hydroxypropyl methyl cellulose and a second binder; and an image-forming layer on the polyester base.

5. The photographic element of claim 4 wherein the image-forming layer is a gelatin-silver halide emulsion layer.

* * * * *